United States Patent
Grandjean et al.

(10) Patent No.: US 11,529,929 B2
(45) Date of Patent: Dec. 20, 2022

(54) WIPER SYSTEM AND A VEHICLE WITH SUCH A WIPER SYSTEM

(71) Applicant: TAIZHOU VALEO WENLING AUTOMOTIVE SYSTEMS CO., LTD, Wenling Taizhou (CN)

(72) Inventors: Denis Grandjean, Wenling Taizhou (CN); Jian Chen, Wenling Taizhou (CN); Haoyi Hong, Wenling Taizhou (CN)

(73) Assignee: TAIZHOU VALEO WENLING AUTOMOTIVE SYSTEMS CO., LTD, Wenling Taizhou (CN)

( * ) Notice: Subject to any disclaimer, the term of this patent is extended or adjusted under 35 U.S.C. 154(b) by 521 days.

(21) Appl. No.: 16/334,516

(22) PCT Filed: Sep. 19, 2017

(86) PCT No.: PCT/CN2017/102192
§ 371 (c)(1),
(2) Date: Mar. 19, 2019

(87) PCT Pub. No.: WO2018/054274
PCT Pub. Date: Mar. 29, 2018

(65) Prior Publication Data
US 2021/0276513 A1    Sep. 9, 2021

(30) Foreign Application Priority Data
Sep. 20, 2016    (CN) .......................... 201610834581.8

(51) Int. Cl.
*B60S 1/34* (2006.01)
*B60S 1/08* (2006.01)

(52) U.S. Cl.
CPC ........... *B60S 1/3418* (2013.01); *B60S 1/0814* (2013.01); *B60S 1/3486* (2013.01); *B60S 1/3495* (2013.01)

(58) Field of Classification Search
CPC .... B60S 1/3418; B60S 1/0814; B60S 1/3486; B60S 1/3495; B60S 1/34; G05B 13/04
(Continued)

(56) References Cited

U.S. PATENT DOCUMENTS 2,895,158 A * 7/1959 Riester .................... B60S 1/245
15/250.3
2016/0039391 A1    2/2016 Okabe et al.

FOREIGN PATENT DOCUMENTS

CN    104842945 A    8/2015
CN    104870269 A    8/2015
(Continued)

OTHER PUBLICATIONS

Office Action issued in Corresponding Chinese Application No. 201610834581.8, dated Jul. 29, 2019 (7 pages).
(Continued)

*Primary Examiner* — Katina N. Henson
(74) *Attorney, Agent, or Firm* — Osha Bergman Watanabe & Burton LLP

(57) ABSTRACT

The present invention proposes a wiper system being capable of ensuring wiping quality for the windshields with complex surfaces. The wiper system comprises: a wiper arm (19), on which a wiper blade (12) for cleaning a surface (16) of an object to be cleaned is provided; a first electrical motor (1) driving the wiper arm (19) to swing; a second electrical motor (9); a sensor (13) measuring a parameter representing the position of the wiper arm on the object to be cleaned; a control unit (7) receiving said parameter from said sensor (13) and utilizing said parameter to control the rotation angle
(Continued)

of the an output shaft (18) of the second electrical motor (9), such that the output shaft (18) drives rotate the wiper blade (12) under control to change the rotation angle of the central plane of the wiper blade with respect to the wiper arm. The present invention also proposes a vehicle comprising said wiper system.

20 Claims, 10 Drawing Sheets

(58) Field of Classification Search
USPC ...................................................... 15/250.13
See application file for complete search history.

(56) References Cited

FOREIGN PATENT DOCUMENTS

| | | | | |
|---|---|---|---|---|
| CN | 205131199 U | 4/2016 | | |
| CN | 105564377 A | 5/2016 | | |
| CN | 205202960 U | 5/2016 | | |
| CN | 205468960 U | 8/2016 | | |
| FR | 2757815 A1 | * | 7/1998 | ............ B60S 1/3486 |
| FR | 2917359 A1 | 12/2008 | | |

OTHER PUBLICATIONS

International Search Report and Written Opinion in corresponding International Application No. PCT/CN2017/102192, dated Dec. 4, 2017 (12 pages).

* cited by examiner

WIPER SYSTEM AND A VEHICLE WITH SUCH A WIPER SYSTEM

TECHNICAL FIELD

The present invention relates to a wiper system and a vehicle with such a wiper system.

BACKGROUND TECHNIQUE

The wiper system is an important part for most vehicles. Typically, the wiper system has a wiper arm and a wiper blade mounted on the wiper arm. Driven by the motor, the wiper arm causes the wiper blade to perform reciprocating swing movement, so as to wipe the vehicle windshield to remove water, dust and/or other debris from the windshield of the vehicle.

The fact that the wiper system effectively cleans the windshield can ensure a driver's good vision, which is an important guarantee for traffic safety.

At present, manufacturers of motor vehicle tend to equip vehicles with windshields with complex surface shapes, for example, at two lateral positions of some vehicle windshields, their windshield surfaces may have a large degree of curvature. It is more difficult to wipe and clean the windshield portions with complicated surface shapes compared to those with relatively flat surface and smaller changes in radius of curvature.

Therefore, the wiper system should be capable of ensuring wiping quality for the windshields with complex surfaces.

THE CONTENT OF THE INVENTION

The present invention firstly proposes a wiper system comprising: a wiper arm, on which a wiper blade for cleaning the surface of an object to be cleaned is provided;
  a first electrical motor driving the wiper arm to swing;
  a second electrical motor for driving the wiper blade;
  a sensor measuring a parameter representing the position of the wiper arm on the object to be cleaned;
  a control unit receiving said parameter from said sensor and utilizing said parameter to control the rotation angles of an output shaft of the second electrical motor, such that the output shaft of the second electrical motor rotates said wiper blade under control to change the rotation angles of the central plane of the wiper blade with respect to the wiper arm.

Optionally, the control unit adjusts the angle of the wiper blade during the entire travel of the wiper arm such that the wiper blade is substantially perpendicular to the surface of the object to be cleaned all the time.

Optionally, the second electrical motor is a servo motor.

Optionally, said first electrical motor drives the wiper arm by a pivot shaft connected with said wiper arm.

Optionally, the parameter measured by said sensor is the rotation angle of said pivot shaft, the control unit utilizing this parameter to determine the position of the wiper arm on the object to be cleaned.

Optionally, the parameter measured by said sensor is the rotation angle of a swing arm connected to and turning said pivot shaft, the control unit utilizing this parameter to determine the position of the wiper arm on the object to be cleaned.

Optionally, said sensor is situated between the swing arm and a housing accommodating said pivot shaft.

Optionally, the parameter measured by said sensor is the rotation angle of a portion of the wiper arm, the control unit utilizing this parameter to determine the position of the wiper arm on the object to be cleaned.

Optionally, said sensor is situated between said portion and a housing accommodating said pivot shaft.

Optionally, the parameter measured by said sensor is the rotation angle of an output shaft of said first electrical motor.

Optionally, said sensor is situated at the output shaft of said first electrical motor.

Optionally, said control unit controls said second electrical motor according to a predetermined relation that is the relation between the position of the wiper arm on the object to be cleaned and the rotation angle of the output shaft of the second electrical motor.

Optionally, for the predetermined relation, a position of the wiper arm with a smaller surface curvature radius on the object to be cleaned corresponds to a bigger rotation angle of the output shaft of the second electrical motor.

Optionally, said wiper arm has a base fixedly connected with said pivot shaft, a retainer and a wiper arm rod, wherein said wiper blade may comprise a wiper blade adapter, and the two ends of the retainer are respectively connected with the base and the wiper arm rod.

Optionally, said second electrical motor is fixed to said retainer or to the wiper blade adapter or to the wiper arm rod.

Optionally, said base comprises a base front-end fixedly and base rear-end, said base rear-end being fixedly connected with said pivot shaft, and the second electrical motor being situated in the base-rear end, and the output shaft driving the base front-end to rotate.

Optionally, the wiper system further comprises a gear set with a first gear connected to the output shaft of the second electrical motor, and a second gear, and the number of teeth of the second gear is bigger than that of the first gear.

Optionally, the second electrical motor is fixed to the housing accommodating the pivot shaft.

Optionally, said pivot shaft is hollow, and the output shaft of the second electrical motor is connected to a gear set which includes a torque transmission shaft passing through the hollow portion of the pivot shaft.

Optionally, the wiper system comprises at least two wiper arms driven by their respective first electrical motors.

Optionally, the wiper system comprises at least two wiper arms which are driven by a first electrical motor common.

The present invention also proposes a vehicle comprising the wiper system as previously described.

Optionally, the object to be cleaned is a windshield of the vehicle.

According to the above-mentioned structures, features and combinations thereof, the wiper system proposed by the present invention is capable of controlling the angle of the wiper blade with respect to the surface of the object to be cleaned through the sensor, the second electrical motor and the control unit, ensuring the cleaning of the object to be cleaned with a complex surface, and the sensor and the second motor having a reasonable structural arrangement.

Hereinafter, the preferred embodiments of the present invention will be described in detail with reference to the accompanying drawings, so that the foregoing features and advantages as well as other features and advantages of the present invention can be readily understood.

BRIEF DESCRIPTION OF THE DRAWINGS

The specific embodiments of the wiper system of the present invention will be described hereinafter with reference to the drawings. In the drawings.

DETAILED EMBODIMENTS

Figure 1:
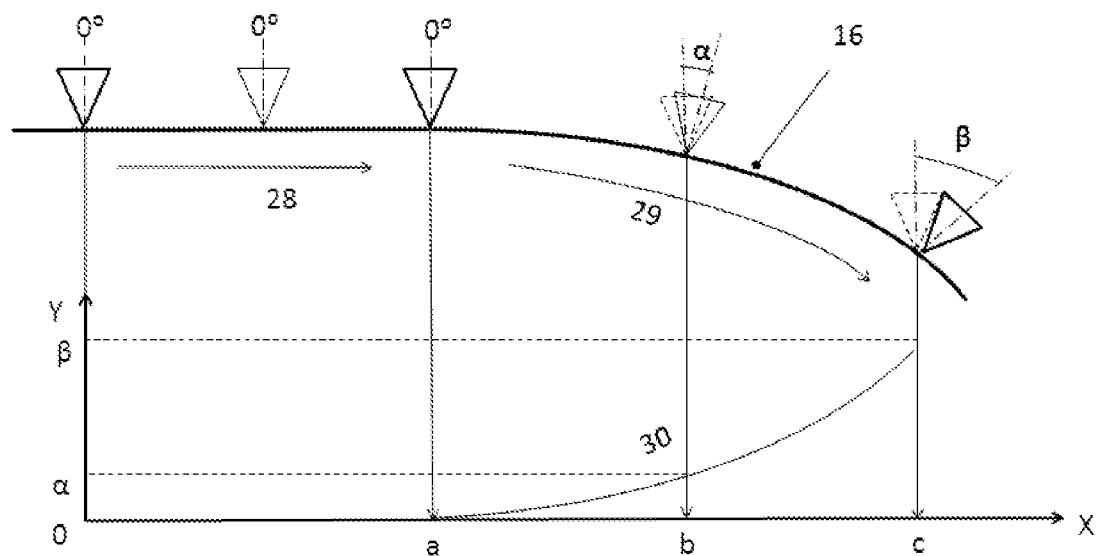
FIG. 1 shows a control logic and control curve of the control unit according to an embodiment of the present invention.

The technical solutions in the embodiments of the present invention will be clearly and completely described below with reference to the drawings of the present invention, and the same reference numerals in the drawings denote the same components. It is to be understood that the described embodiments are part of the embodiments of the present invention, but not all the embodiments. Based on the embodiments of the invention, all other embodiments obtained by those of ordinary skill in the art without carrying out inventive work are intended to be within the scope of the present invention.

It is to be understood that the terms "a vehicle" or "a vehicle's" or other similar terms used herein include conventional motor vehicles, such as sport utility vehicles (SUV), buses, trucks, various commercial vehicles, etc., and includes hybrid vehicles, pure electric vehicles, plug-in hybrid electric vehicles, hydrogen-powered vehicles and other vehicles using alternative fuels (for example, fuels derived from resources other than oil).

As mentioned earlier, at present, manufacturers of vehicles tend to equip vehicles with windshields with complex surface shapes. In the embodiment shown in FIGS. 7-10, the windshield surface at the middle of the vehicle windshield, which may correspond to the flat surface 28 in the simplified schematic diagram of FIG. 1, is relatively flat; at positions on both sides of the vehicle windshield, the windshield surface is non-flat, which is generally reflected by the fact that the windshield surface has a varying curvature radius in this region which may correspond to the complex surface 29 in the simplified schematic diagram of FIG. 1.

The wiper system of the present invention can ensure the cleaning of the entire windshield surface by the following configuration.

In the case of FIGS. 2-4 and 7-10, the wiper system of the present invention comprises at least one wiper arm 19. For example, the wiper system in the embodiment of FIGS. 7-8 includes two wiper arms swinging in opposite directions, and the wiper system in the embodiment of FIG. 9 includes two wiper arms swinging in the same direction, while the embodiment of FIG. 10 has only one wiper arm. Each of the wiper arms 19 is provided with a wiper blade 12 which directly contacts the surface of the object to be cleaned, such as a windshield of a vehicle, so as to clean it.

Figure 7:
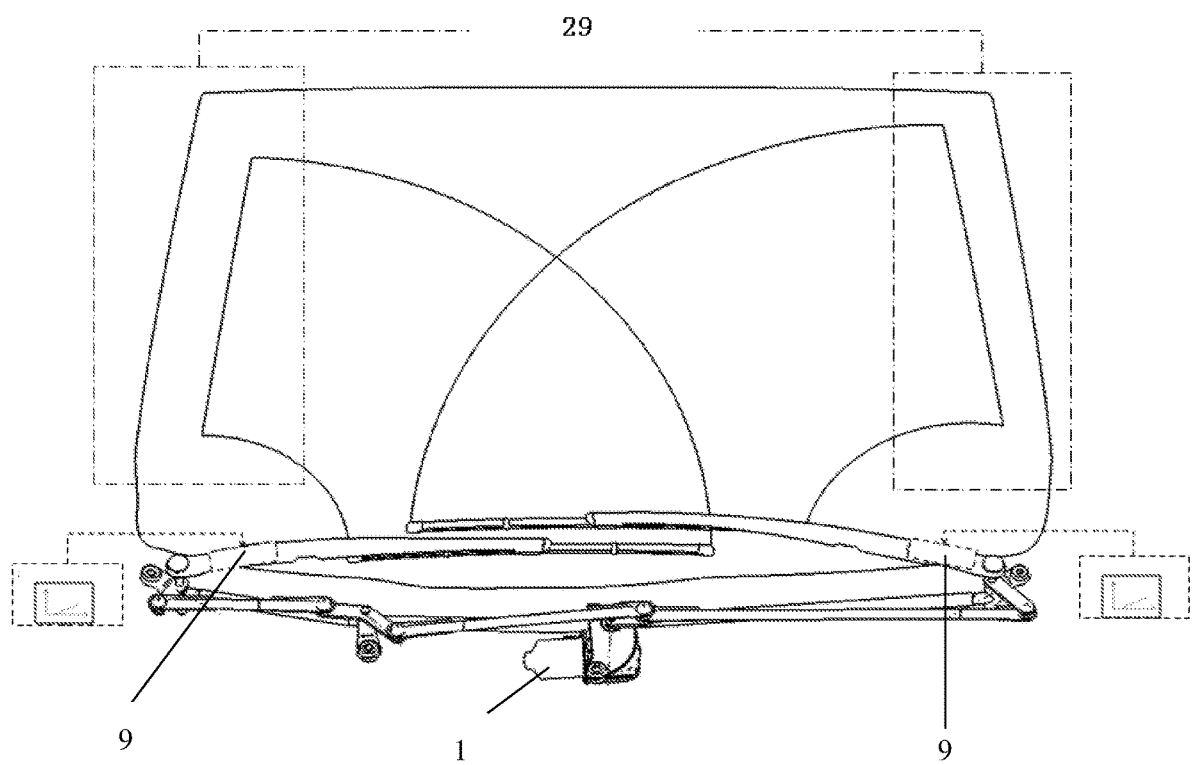
FIGS. 7-10 show a general view of several embodiments of the wiper system in accordance with the present invention.
Figure 8:
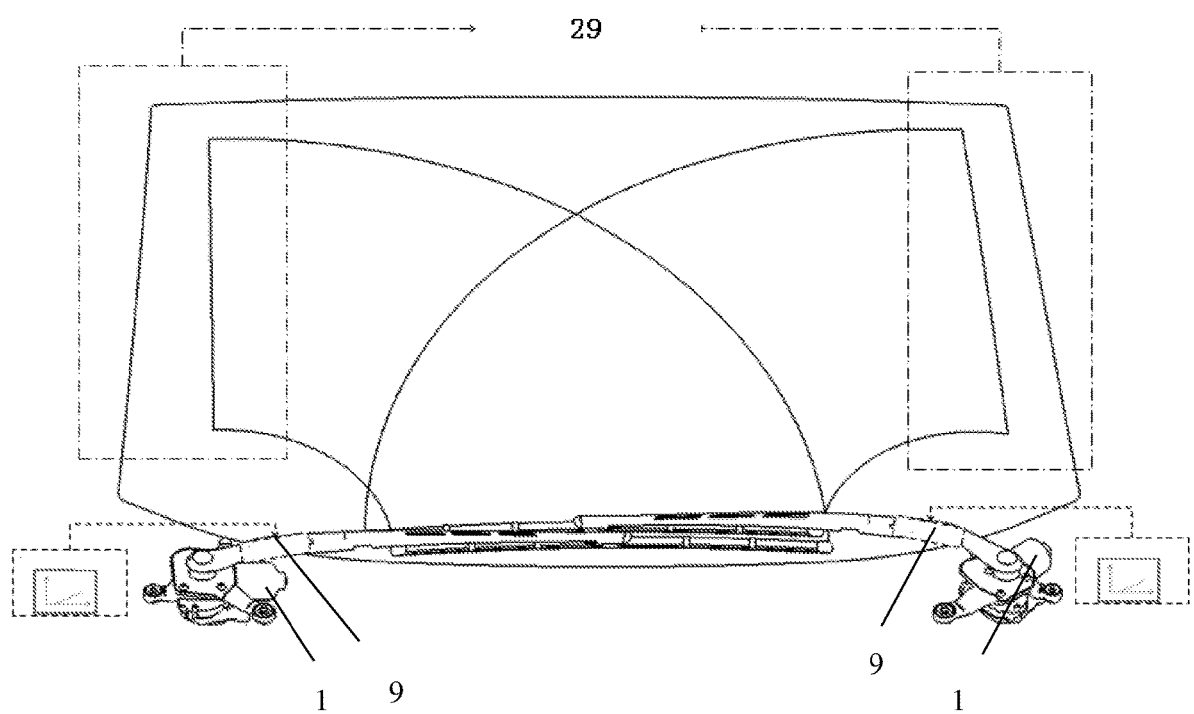
Figure 9:
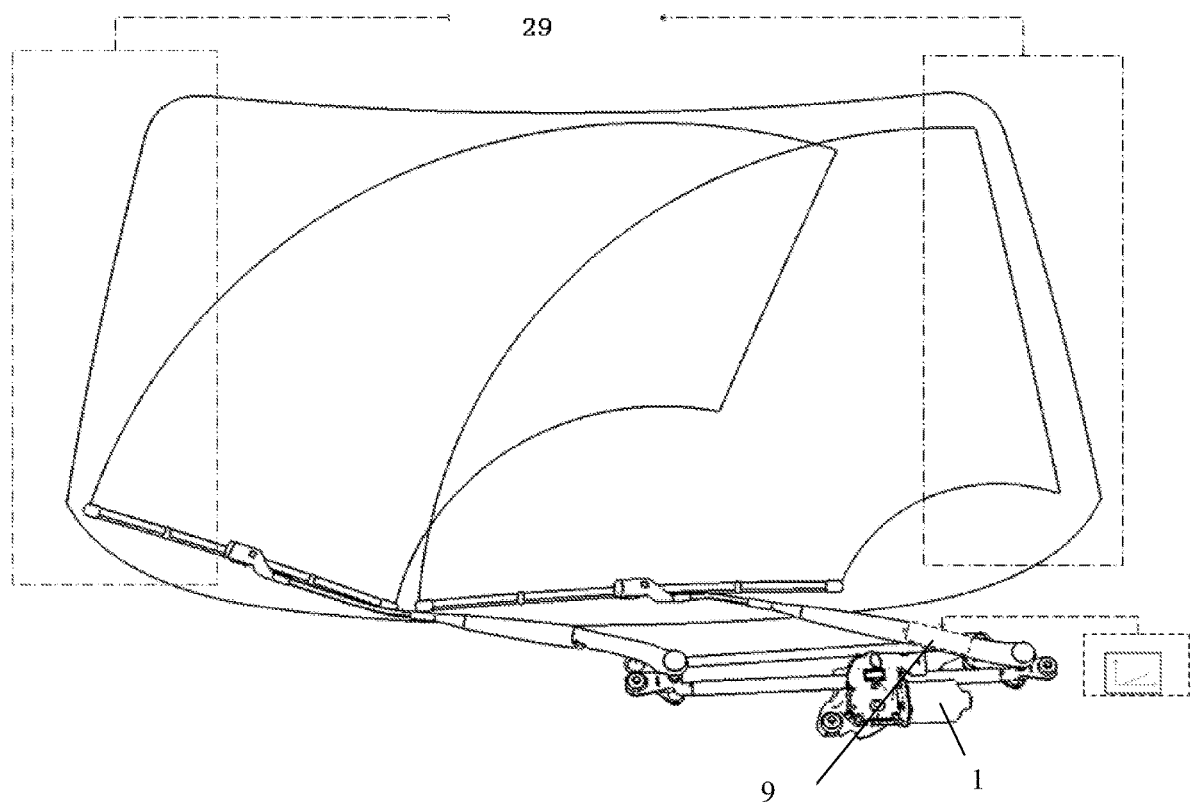
Figure 10:
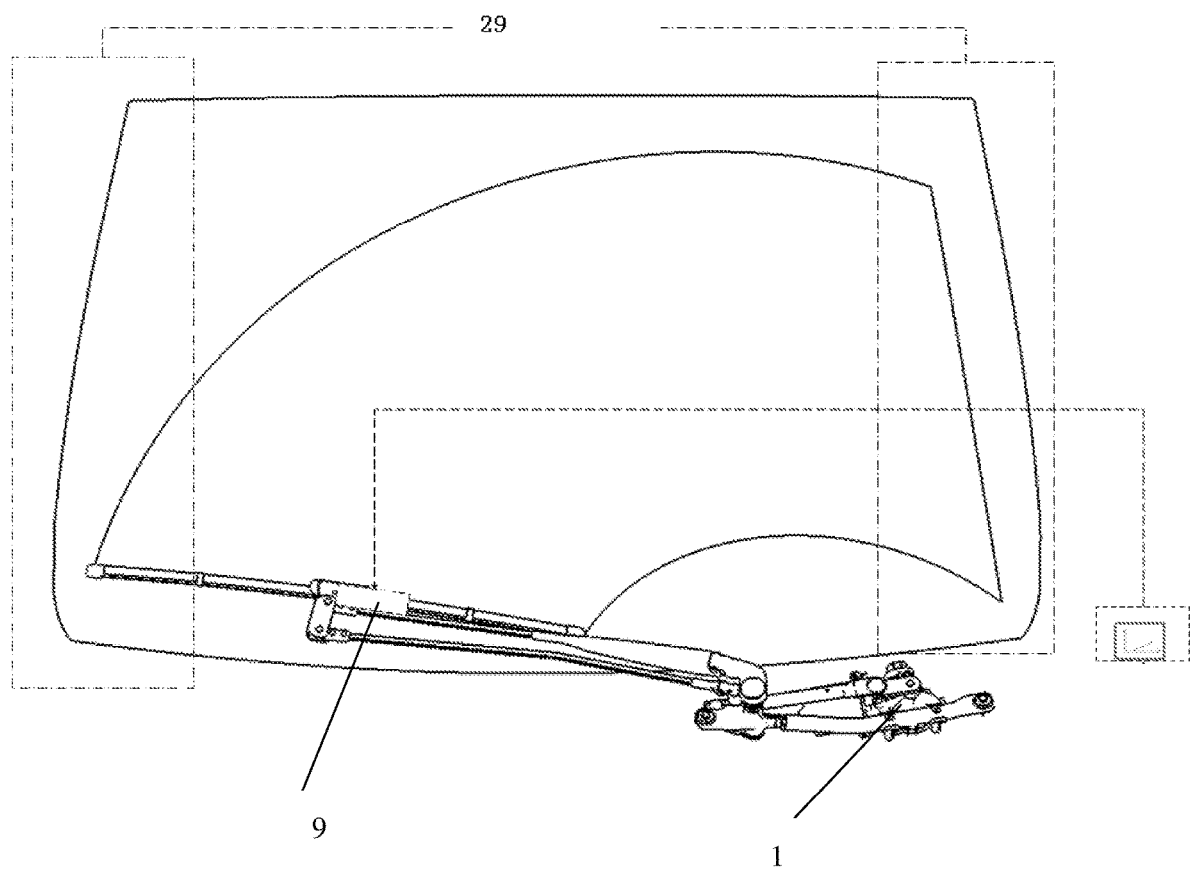

The wiper system comprises at least one first electrical motor 1 which drives the wiper arm 19 to swing. The wiper system may have only one first electrical motor which simultaneously drives the two wiper arms 19 to swing, for example as shown in FIGS. 7 and 9. Optionally, each wiper arm may have a respective first electrical motor, such as shown in FIG. 8.

In addition, a second electrical motor 9 may be provided, and the second electrical motor 9 has an output shaft 18 which drives the blade 12 under control to change the rotation angle of the center plane of the wiper blade relative to the wiper arm, so as to adjust angle of the wiper blade 12 relative to the object to be cleaned, making the blade being substantially perpendicular to the surface 16 of the object to be cleaned all the time. Specifically, as shown in FIG. 1, the angle of the wiper blade with respect to the object to be cleaned refers to the angle of the center cross section of the wiper blade with respect to the surface of the object to be cleaned. In the flat surface area (the areas "0" to "a" in FIG. 1), the wiper blade may be set to be perpendicular to the surface of the object to be cleaned by default, thus the second electrical motor may not rotate the wiper blade during the wiper blade' travel from position "0" to position "a". In the complex surface areas (the areas "a" to "c" in FIG. 1), if the second electrical motor does not drive the wiper blade to rotate, the wiper blade will have a non-right angle with respect to this complex surface at the complex surface, which is shown by the wiper blade in phantom in FIG. 1. For this purpose, in the present invention, when the wiper arm and the wiper blade are passing a complex surface, the second electrical motor 9 rotates the wiper blade so that the wiper blade is always substantially perpendicular to the surface of the object to be cleaned. It should be noted that the wiper blade does not have to be strictly perpendicular to the surface of the object to be cleaned. Preferably, the control unit 7 adjusts the angle of the wiper blade 12 such that the angle of the wiper blade relative to the surface of the object to be cleaned is maintained at 80-90 degrees, preferably at 85-90 degrees. In addition, the control unit 7 preferably adjusts the angle of the wiper blade during the entire travel of the wiper arm so that wiper the blade is always substantially perpendicular to the surface of the object to be cleaned.

According to a preferred embodiment, the second electrical motor 9 is a servo motor. The servo motor can rotate for a plurality of angles according to the input parameters of the control unit 7, and can even rotate steplessly, so that it is satisfactorily adapted to the complex glass surfaces with variable curvature radius. The operation of the second electrical motor 9 is controlled by the control unit 7. The control unit 7 receives a parameter from the sensor 13 which represents the position of the wiper arm in the travel, i.e. the position of the wiper arm on the object to be cleaned, and uses this parameter to control the rotation angle of the output shaft 18 of the second electrical motor 9, thereby to control the angle of the wiper blade relative to the surface of the object to be cleaned.

FIG. 1 shows the control logic of the control unit 7 and the relationship between the rotation angle of the output shaft of the second electrical motor 9 (vertical axis) and the position of the wiper blade (horizontal axis). The control unit 7 sends a first command to the second electrical motor 9 during the travel of the wiper blade from the position "0" to "a" (flat surface areas), so that the second electrical motor 9 does not rotate. The control unit 7 sends a second command to the second electrical motor 9 during the travel of the wiper blade from the position "a" to "c" (complex surface areas), so that the second electrical motor 9 rotates according to a predetermined relationship 14. The predetermined relationship (such as the control curve 30 in FIG. 1) is the relationship between the position of the wiper arm 19 on the object to be cleaned and the rotation angle of the output shaft 18 of the second electrical motor 9. For the predetermined relationship, a position of the wiper arm with a smaller surface curvature radius on the object to be cleaned corresponds to a bigger rotation angle of the output shaft 18 of the second electrical motor, for example, the rotation angle is 0 degrees at the position "a", the rotation angle is a at the position "b" and the rotation angle is β at the position "c", and the angle β is larger than the angle α since the surface curvature radius of the object to be cleaned is smaller at the position "c". The predetermined relationship may be previously stored in the control unit 7.

Figure 2:
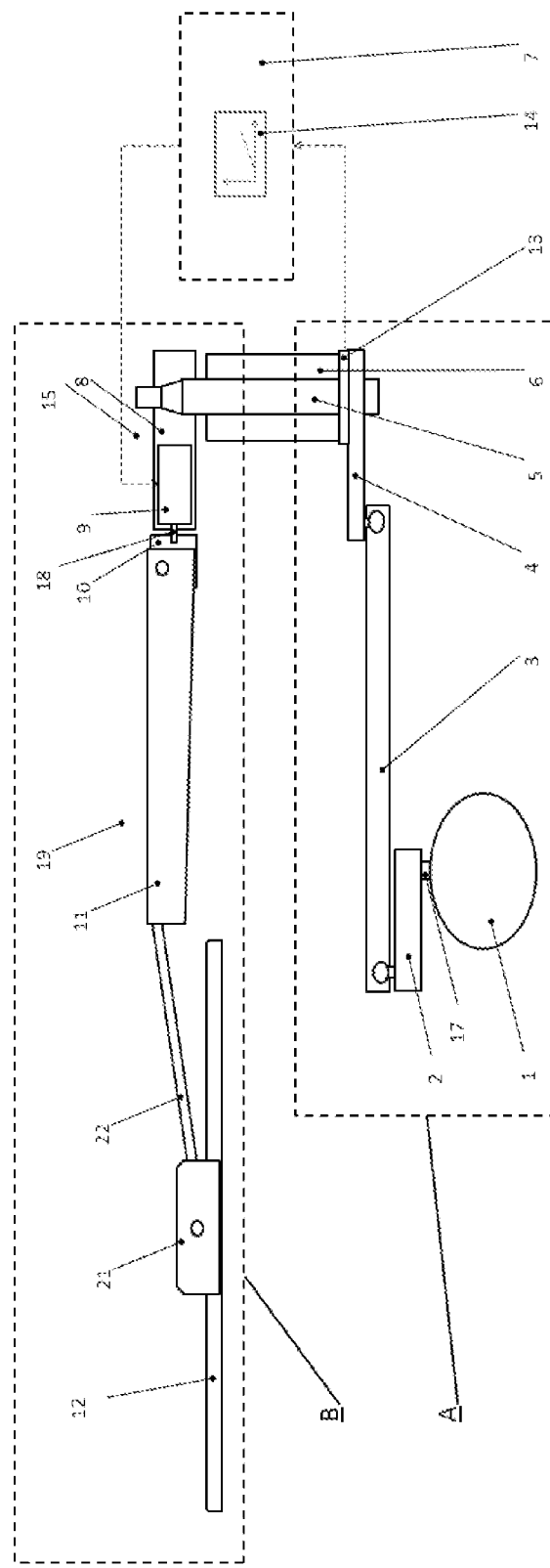
FIGS. 2-4 show several embodiments according to the invention, in which the sensor is arranged at different locations.
Figure 3:
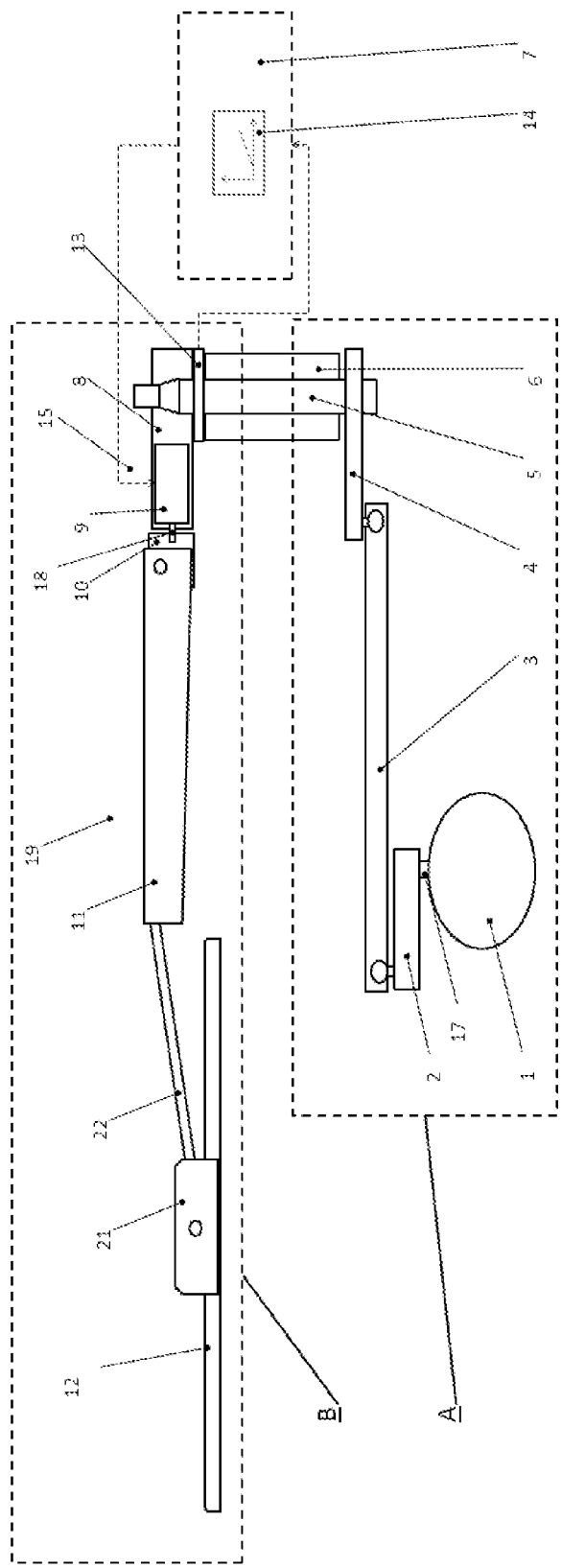
Figure 4:
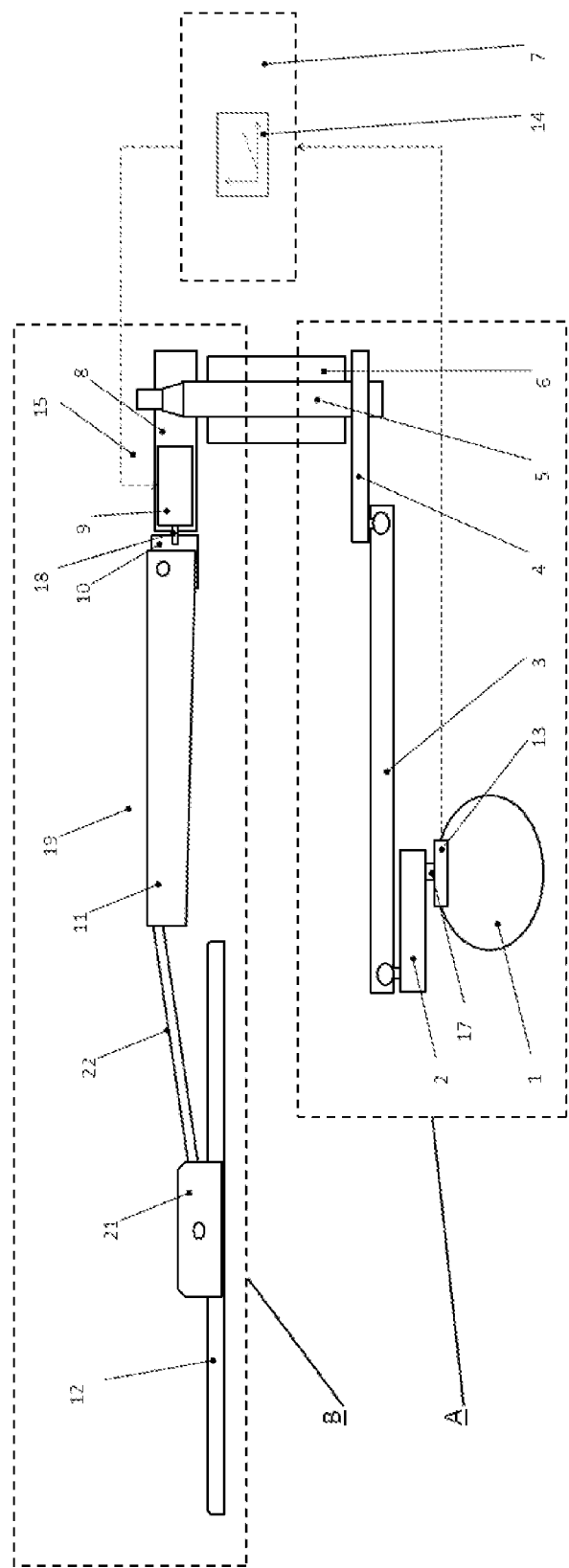

FIGS. 2-4 illustrate an alternative embodiment of the wiper system of the present invention, wherein FIGS. 2-4 show respectively three embodiments wherein the sensor is located at different locations.

In FIG. 2, for example, the wiper system may include a power transmission assembly and an assembly of the wiper arm and the wiper blade. As shown in the figure, the frame A represents the power transmission assembly including a first electrical motor 1 fixed to the vehicle, a crank 2 connected to an output shaft 17 of the first electrical motor 1, a connecting rod 3 connected to the crank 2, a swinging arm 4 connected to the connecting rod 3, and a rotary shaft 5 pivotally fixed in the housing 6. The frame B represents the assembly of the wiper arm and the wiper blade and may comprise a base 20, a retainer 11, a wiper blade 12. In the embodiment of FIGS. 2-4, the base 20 is divided into a base rear-end 8 fixedly connected to the pivot shaft 5 and a base front-end 10, and the second electrical motor 9 is mounted within the base rear-end 8. The base front-end 10 is fixedly connected to the output shaft 18 of the second electrical motor 9, so that the rotation of the output shaft of the second electrical motor 9 can cause the base front-end 10 to rotate. The retainer 11 is fixed to the base front-end 10 and serves to hold the wiper arm 22.

In this way, the power from the output shaft 17 of the first electrical motor 1 is transmitted to the rotary shaft 5 through the crank 2, the connecting rod 3 and the swinging arm 4, and then the rotary shaft 5 drives the wiper arm 19. Wherein the swinging arm 4 is connected to the pivot shaft 5 and rotates the pivot shaft 5. Thus, the rotation angle of the rotary shaft 5 or the swinging arm 4 is in one-to one corresponding relationship to the position of the wiper arm on the surface to be cleaned, therefore the position of the wiper arm on the surface of the object to be cleaned can be determined by determining the angle of the rotary shaft 5 or the swinging arm 4. For example, the position of the wiper arm on the surface of the object to be cleaned can be determined by measuring the angle of the rotary shaft 5 or the swinging arm 4 with respect to a stationary member. It is to be noted that in the various embodiments of the present invention, the stationary member may be a pivot housing 6 for accommodating the rotary shaft 5 that is fixed to the vehicle, but may be any other static member fixed with respect to the vehicle body.

In the embodiment of FIG. 2, the sensor 13 is located between the swinging arm 4 and the housing 6, so that the sensor 13 can measure the rotation angle of the pivot shaft 5 with respect to the housing 6. Alternatively, the sensor 13 may measure the angle of the swinging arm 4 relative to the housing 6.

Optionally, the sensor 13 may be located between a portion 15 of the wiper arm and the housing 6. In the embodiment of FIG. 3, the portion 15 is the base end 8, the sensor 13 is assembled between the base end 8 and the housing 6, and the parameter measured by the sensor 13 is the rotation angle of the portion 15, i.e. the base end 8, relative to the housing 6. In the embodiment shown in FIGS. 5-6, the base is not divided into a base front-end and a base rear-end, therefore the portion 15 may be a base 20, and the sensor can measure the rotation angle of the base 20 relative to the housing 6.

In the embodiment shown in FIG. 4, the sensor 13 is assembled on the first electrical motor, preferably at the output shaft 17 of the first electrical motor 1, and the parameters measured by the sensor 13 is the rotation angle of the output shaft 17 of the first electrical motor 1. According to the power transmission relationship as described above, the rotation angle of the output shaft 17 is in one-to-one corresponding relationship with the position of the wiper arm on the surface to be cleaned, therefore the position of the wiper arm on the surface of the object to be cleaned can be determined by determining the rotation angle of the output shaft 17.

Figure 5:
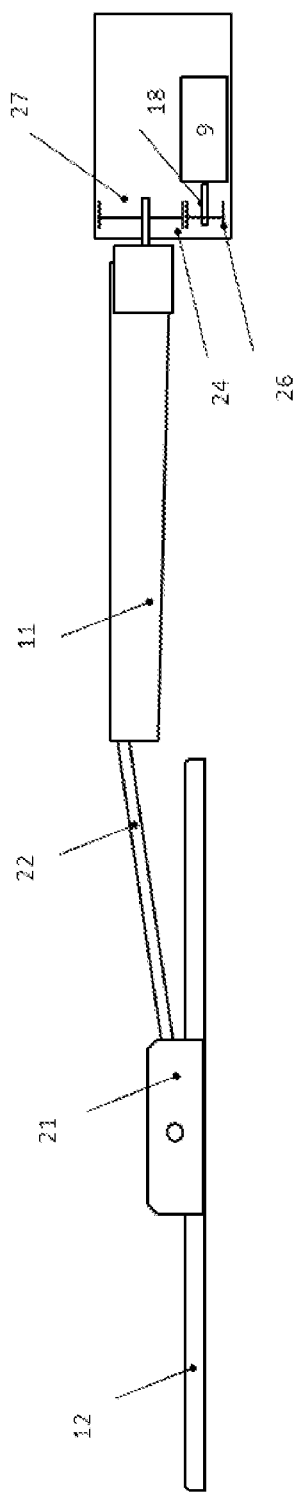
FIGS. 5-6 show several embodiments according to the invention, in which the second electrical motor is arranged at different locations.
Figure 6A:
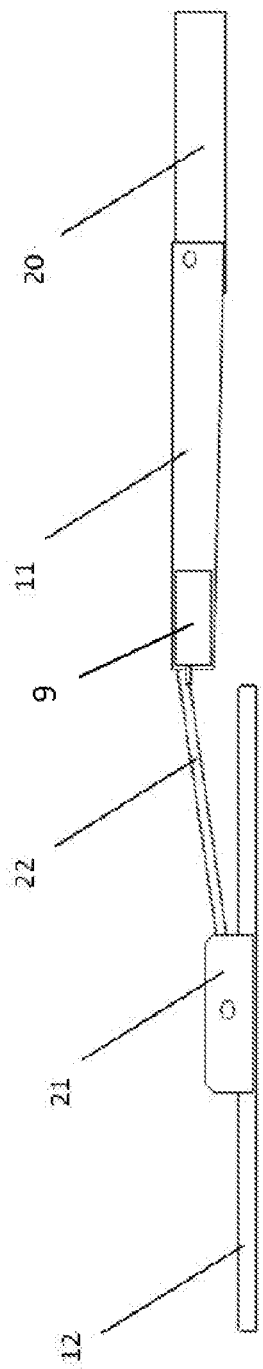
Figure 6B:
Figure 6C:
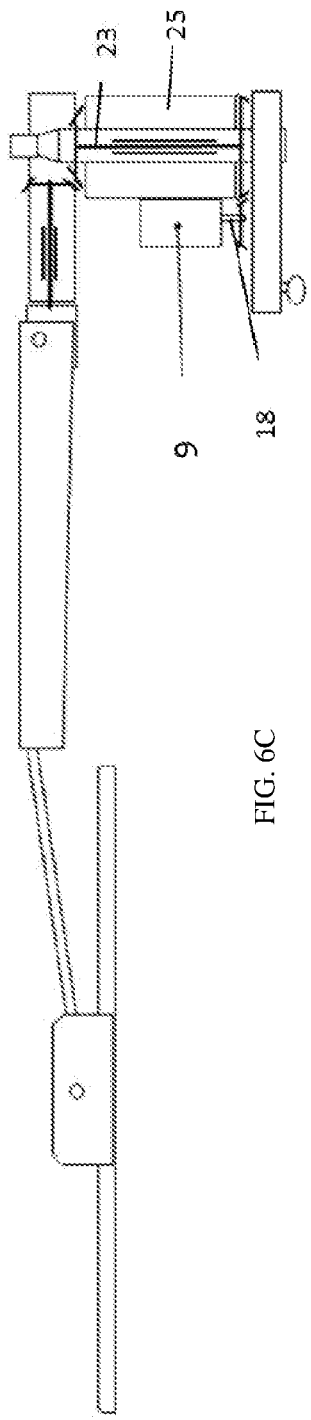

In the embodiment of FIGS. 2-4 described above, the second electrical motor is located within the base rear-end 8 of the base 20. While FIGS. 5-6 show an embodiment wherein the second electrical motor is located at another location. In the embodiment shown in FIGS. 5, 6A-6C, the wiper arm 19 has a base 20 fixedly connected with said pivot shaft 5, a retainer 11, a wiper arm rod 22 and a wiper blade adapter 21 comprising a wiper blade adapter 21, the two ends of the retainer 11 being respectively connected to the base and the wiper arm rod.

In the embodiment shown in FIG. 5, the second electrical motor is located in the base 20, and the output shaft 18 is connected to the retainer 11 by means of a gear set 24. The gear set has a first gear 26 connected to the output shaft 18 of the second electrical motor 9, and a second gear 27, and the number of teeth of the second gear is bigger than that of the first gear.

In FIG. 6A, the second electrical motor 9 is fixed within the holder 11 and its output shaft 18 is connected to the wiper arm rod 22 and drives the wiper arm rod 22 to rotate, and thereby causes the wiper blade 12 to rotate.

In FIG. 6B, the second electrical motor is fixed within the wiper blade adapter 21, and its output shaft 18 is connected to the wiper arm rod 22. The second electrical motor drives the wiper blade 12 to rotate and rotates itself with the wiper blade 12.

In FIG. 6C, the second electrical motor 9 is fixed to the housing 6 accommodating the pivot shaft 5. The pivot shaft 5 is arranged in a hollow shape, and the output shaft 18 of the second electrical motor drives the retainer through the gear set 25 to transmit the power of the output shaft 18 to the retainer. For this purpose, the gear set 25 comprises a torque transmission shaft 23 extending through the hollow portion of the pivot shaft 5.

It is to be noted that the scope of the present patent is not limited to the specific embodiments described above, and more embodiments may be obtained by combining the above-described features. For example, the embodiment of FIG. 10 has only one wiper arm, and the angle of the wiper blade is controlled by means of one second electrical motor 9 and one control unit. While in FIGS. 7-8, the wiper system comprises two wiper arms, each of which is provided with a respective second electrical motor 9, and each second electrical motor 9 is controlled by a respective control unit 7, further as in the embodiment of FIG. 9, the wiper system comprises two wiper arms swinging in the same direction and driven by a common first electrical motor, and can realize that only one wiper arm is provided with a second electrical motor 9. In the embodiment of FIGS. 7-10, the arrangement of the sensors may be as described in any of the preceding embodiments.

The term "substantially" as used herein is to be understood as being within the scope of normal tolerances in the art, for example within two standard deviations of a mean value, unless specifically stated or explicitly stated in the context. "Substantially" can be understood as within 10%, 9%, 8%, 7%, 6%, 5%, 4%, 3%, 2%, 1%, 0.5%, 0.1%, 0.05% or 0.01% of a set value. Unless otherwise expressly in the context, all values provided herein may be corrected by the term "substantially".

The wiper system for cleaning the vehicle windshield has been described in detail with reference to the preferred embodiments, but it will be understood by those skilled in the art that the wiper system may also be used to clean other surfaces to be cleaned other than the vehicle windshield. In addition, various modifications and variations can be made to the above-described embodiments without departing from the concept of the present invention, and various combinations of the technical features and configurations proposed by the present invention may be performed without departing from the scope of the invention.

LIST OF REFERENCE SIGNS 1 electrical motor
2 crank
3 connecting rod
4 swinging arm
5 rotary shaft
6 housing
7 control unit
8 base rear-end
9 second electrical motor
10 base front-end
11 retainer
12 wiper blade
13 sensor
14 predetermined relationship
15 portion of the wiper arm
16 surface of the object to be cleaned
17 output shaft of the first electrical motor
18 output shaft of the second electrical motor
19 wiper arm
20 base
21 wiper blade adapter
22 wiper arm rod
23 torque transmission shaft
24 gear set
25 gear set
26 first gear
27 second gear
28 flat surface
29 complex surface
30 control curve

The invention claimed is:

1. A wiper system, comprising:
a wiper arm, on which a wiper blade for cleaning a surface of an object to be cleaned is provided;
a first electrical motor for driving the wiper arm to swing by a pivot shaft connected to the wiper arm;
a second electrical motor fixed to a housing accommodating the pivot shaft;
a sensor for measuring a parameter representing a position of the wiper arm on the object to be cleaned; and
a control unit for receiving said parameter from said sensor and utilizing said parameter to control a rotation angle of an output shaft of the second electrical motor, such that the output shaft rotates the wiper blade under control to change a rotation angle of a central plane of the wiper blade with respect to the wiper arm,
wherein the pivot shaft is hollow, and the output shaft of the second electrical motor, which is different from the first electrical motor, is connected to a gear set comprising a torque transmission shaft passing through the hollow portion of the pivot shaft,
wherein the torque transmission shaft is different from the output shaft.

2. The wiper system as claimed in claim 1, wherein the control unit adjusts the rotation angle of the wiper blade during an entire travel of the wiper arm, such that the wiper blade is substantially perpendicular to the surface of the object to be cleaned all the time.

3. The wiper system as claimed in claim 1, wherein the second electrical motor is a servo motor.

4. The wiper system as claimed in claim 1, wherein the parameter measured by said sensor is the rotation angle of said pivot shaft, the control unit utilizing this parameter to determine the position of the wiper arm on the object to be cleaned.

5. The wiper system as claimed in claim 4, wherein said sensor is situated between a swinging arm and the housing accommodating said pivot shaft.

6. The wiper system as claimed in claim 1, wherein the parameter measured by said sensor is the rotation angle of a swinging arm connected to and rotating said pivot shaft, the control unit utilizing this parameter to determine the position of the wiper arm on the object to be cleaned.

7. The wiper system as claimed in claim 1, wherein the parameter measured by said sensor is the rotation angle of a portion of the wiper arm, the control unit utilizing this parameter to determine the position of the wiper arm on the object to be cleaned.

8. The wiper system as claimed in claim 7, wherein said sensor is situated between said portion and the housing accommodating said pivot shaft.

9. The wiper system as claimed in claim 1, wherein the parameter measured by said sensor is the rotation angle of an output shaft of said first electrical motor.

10. The wiper system as claimed in claim 9, wherein said sensor is situated at the output shaft of said first electrical motor.

11. The wiper system as claimed in claim 1, wherein said control unit controls said second electrical motor according to a predetermined relationship that is a relationship between the position of the wiper arm on the object cleaned and the rotation angle of the output shaft of the second electrical motor.

12. The wiper system as claimed in claim 11, wherein for the predetermined relationship, the position of the wiper arm with smaller surface curvature radius on the object to be cleaned corresponds to a bigger rotation angle of the output shaft of the second electrical motor.

13. The wiper system as claimed in claim 1, wherein said wiper arm has a base fixedly connected to said pivot shaft, a retainer and a wiper arm rod, wherein the wiper blade comprises a wiper blade adapter, and two ends of the retainer are respectively connected to the base and the wiper arm rod.

14. The wiper system as claimed in claim 13, wherein said second electrical motor is fixed to said retainer or to said wiper blade adapter or to said wiper arm rod.

15. The wiper system as claimed in claim 13, wherein said base comprises a base front-end and a base rear-end which is fixedly connected to the pivot shaft and in which the second electrical motor is situated, the output shaft driving said base front-end to rotate.

16. The wiper system as claimed in claim 15, further comprising a gear set comprising a first gear connected to the output shaft of said second electrical motor and a second gear, wherein a number of teeth of the second gear is bigger than that of the first gear.

17. The wiper system as claimed in claim 1, comprising at least two wiper arms driven by respective first electrical motors.

18. The wiper system as claimed in claim 1, comprising at least two wiper arms driven by a common first electrical motor.

19. A vehicle comprising: the wiper system as claimed in claim 1.

20. The vehicle as claimed in claim 19, wherein said object to be cleaned is a windshield of the vehicle.

* * * * *